US010599926B2

United States Patent
Papanikolopoulos et al.

(10) Patent No.: US 10,599,926 B2
(45) Date of Patent: Mar. 24, 2020

(54) AUTOMATED DETECTION OF NITROGEN DEFICIENCY IN CROP

(71) Applicant: Regents of the University of Minnesota, Minneapolis, MN (US)

(72) Inventors: Nikolaos Papanikolopoulos, Minneapolis, MN (US); Vassilios Morellas, Minneapolis, MN (US); Dimitris Zermas, Minneapolis, MN (US); David Mulla, Minneapolis, MN (US); Michael Bazakos, Minneapolis, MN (US); Daniel Kaiser, Minneapolis, MN (US)

(73) Assignee: Regents of the University of Minnesota, Minneapolis, MN (US)

( * ) Notice: Subject to any disclaimer, the term of this patent is extended or adjusted under 35 U.S.C. 154(b) by 542 days.

(21) Appl. No.: 15/380,471

(22) Filed: Dec. 15, 2016

(65) Prior Publication Data
US 2017/0177938 A1    Jun. 22, 2017

Related U.S. Application Data

(60) Provisional application No. 62/268,233, filed on Dec. 16, 2015.

(51) Int. Cl.
*G06K 9/00* (2006.01)
*G06T 7/11* (2017.01)
*G06T 7/90* (2017.01)

(52) U.S. Cl.
CPC ............ *G06K 9/00657* (2013.01); *G06T 7/11* (2017.01); *G06T 7/90* (2017.01); *G06T 2207/10024* (2013.01); *G06T 2207/20036* (2013.01); *G06T 2207/20044* (2013.01); *G06T 2207/20076* (2013.01); *G06T 2207/20081* (2013.01)

(58) Field of Classification Search
None
See application file for complete search history.

(56) References Cited

U.S. PATENT DOCUMENTS

| | | | |
|---|---|---|---|
| 9,652,840 B1 * | 5/2017 | Shriver | G01N 33/0098 |
| 2015/0254800 A1 * | 9/2015 | Johnson | C05C 11/00 |
| | | | 382/141 |

OTHER PUBLICATIONS

Webpage, Agribotix, http://agribotix.com, 3 pages, accessed Sep. 2016.

(Continued)

*Primary Examiner* — Matthew C Bella
*Assistant Examiner* — Brian D Shin
(74) *Attorney, Agent, or Firm* — Westman, Champlin & Koehler, P.A.; Theodore M. Magee

(57) ABSTRACT

Pixel color values representing an image of a portion of a field are received where each pixel color value has a respective position within the image. A processor identifies groups of the received pixel color values as possibly representing a Nitrogen-deficient plant leaf. For each group of pixel color values, the processor converts the pixel color values into feature values that describe a shape and the processor uses the feature values describing the shape to determine whether the group of pixel color values represents a Nitrogen-deficient leaf of a plant. The processor stores in memory an indication that the portion of the field is deficient in Nitrogen based on the groups of pixel color values determined to represent a respective Nitrogen-deficient leaf.

20 Claims, 11 Drawing Sheets

(56) References Cited

OTHER PUBLICATIONS

Baret, About the Soil Line Concept in Remote Sensing, Advanced Space Research, vol. 13, No. 5, pp. (5)281-(5)284, 1993.
Blackmer et al., Nitrogen deficiency detection using reflected short-wave radiation from irrigated corn canopies, Agronomy Journal, vol. 88, No. 1, pp. 15, 1996.
Chaerle et al., Monitoring and screening plant populations with combined thermal and chlorophyll fluorescence Imaging, Journal of Experimental Botany, Vo. 58, No. 4, pp. 773-784, 2007.
Chaerle et al., Multi-Sensor imaging of plant stresses: towards the development of a stress-catalogue, Biotechnology Journal, vol. 4, No. 8, pp. 1152-1167, 2009.
Webpage, Delair-Tech, http://dronelife.com/2014/07/25/delair-tech-beyond-line-of-sight/, accessed Sep. 2016.
Jain, Image Data Compression: A Review, Proceedings of the IEEE, vol. 69, No. 3, pp. 349-401, 1981.
Jain et al., Data Clustering: A Review, ACM Computing Surveys, vol. 31, No. 3, pp. 264-323, 1999.
Kyveryga et al., Normalization of uncalibrated late-season digital aerial imagery for evaluating corn nitrogen status, Precision Agriculture, vol. 13, No. 1, pp. 2-16, 2012.
Leinonen et al., Combining thermal and visible imagery for estimating canopy temperature and identifying plant stress, Journal of Experimental Botany, vol. 55, No. 401, pp. 1423-1431, 2004.
LeLong et al., Assessment of unmanned aerial vehicles imagery for quantitative monitoring of wheat crop in small plots, Sensors, vol. 8, No. 5, pp. 3557-3585, 2008.
Longchamps et al., Early detection of nitrogen deficiency in corn using fluorescence, Agronomy Journal, vol. 106, No. 2, pp. 511-518, 2014.
Lucieer et al., Using an unmanned aerial vehicle (UAV) for ultra-high resolution mapping of Antarctic moss beds, 15th Australasian Remote Sensing Photogrammetry Conference, pp. 1-14, 2010.
Malenovsky et al., Scientific and technical challenges in remote sensing of plant canopy reflectance and fluorescence, Journal of Experimental Botany, vol. 60, No. 11, pp. 2987-3004, 2009.
Mulla, Twenty five years of remote sensing in precision agriculture: key advances and remaining knowledge gaps, Biosystems Engineering, vol. 114, No. 4, pp. 358-371, 2013.
Osborne et al., Detection of phosphorus and nitrogen deficiencies in corn using spectral radiance measurements, Agronomy Journal, vol. 94, No. 6, pp. 1215-1221, 2002.
Webpage, http://precisionhawk.com, accessed Sep. 2016.
Quemada et al., Airborne hyperspectral images and ground-level optical sensors as assessment tools for maize nitrogen fertilization, Remote Sensing, vol. 6, No. 4, pp. 2940-2962, 2014.
Telea et al., An augmented fast marching method for computing skeletons and centerlines, in in Proceeding of the Symposium on Data Visualisation, pp. 251-259, 2002.
Tremblay et al., Sensing crop nitrogen status with fluorescence indicators. A review, Agronomy for Sustainable Development, vol. 32, No. 2, pp. 451-464, 2012.
Webpage, Honey Comb's AgDrone, http://honeycombcorp.com/agdrone-uas/), accessed Sep. 2016.
Webpage, SenseFly's eBee Ag drone, http://www.sensefly.com/drones/ebee-ag.html, accessed Sep. 2016.
Webpage, URSULA Drones, http://www.ursula-agriculture.com, accessed Sep. 2016.

\* cited by examiner

AUTOMATED DETECTION OF NITROGEN DEFICIENCY IN CROP

CROSS-REFERENCE TO RELATED APPLICATION

The present application is based on and claims the benefit of U.S. provisional patent application Ser. No. 62/268,233, filed Dec. 16, 2015, the content of which is hereby incorporated by reference in its entirety.

BACKGROUND

In order for plants to grow properly, they must have access to UV light, water and certain nutrients. For corn plants, one of the key nutrients is nitrogen (N). Corn plants absorb mineral forms of nitrogen from the soil. However, the amount of nitrogen available in the soil can change rapidly over time due to bacteria, water leaching, vaporization, and plant uptake. In addition, these changes can affect different parts of a corn field differently resulting in some areas have sufficient nitrogen and some areas having insufficient nitrogen. In the past, some farms have applied extra nitrogen to the entire field to ensure that there was sufficient nitrogen for every plant. However, applying too much nitrogen to a field has negative environmental consequences and increases the costs associated with producing the crop.

SUMMARY

In one embodiment, pixel color values representing an image of a portion of a field are received where each pixel color value has a respective position within the image. A processor identifies groups of the received pixel color values as possibly representing a Nitrogen-deficient plant leaf. For each group of pixel color values, the processor converts the pixel color values into feature values that describe a shape and the processor uses the feature values describing the shape to determine whether the group of pixel color values represents a Nitrogen-deficient leaf of a plant. The processor stores in memory an indication that the portion of the field is deficient in Nitrogen based on the groups of pixel color values determined to represent a respective Nitrogen-deficient leaf.

In a further embodiment, a system includes an interface receiving image data collected by an unmanned aerial vehicle, the image data representing an image of a portion of an agricultural field in the visible spectrum. A processor processes the image data to identify a plurality of areas in the image that each possibly show a Nitrogen-deficient leaf and for each identified area, identifies features of a shaped region within the area to verify that the area shows a Nitrogen-deficient leaf. The verified areas are used to store an indication of a Nitrogen level in the portion of the agricultural field.

In a still further embodiment, a computer-implemented method includes limiting a Nitrogen-deficiency assessment of leaves in an image to select leaves in the image by grouping pixels in the image into groups based on the visible color of each pixel and identifying the select leaves as leaves that include pixels of a particular group. The Nitrogen-deficiency assessment is performed on the select leaves, where the Nitrogen-deficiency assessment of a leaf involves identifying a skeleton for a spatial shape formed by the pixels in the particular group for the leaf and using the skeleton to generate shape feature values for the spatial shape. The shape feature values are then used to classify the leaf into one of a plurality of Nitrogen-deficiency classes.

DETAILED DESCRIPTION

In accordance with the various embodiments, a system and method are provided that identify which areas of a field are nitrogen-deficient so that additional nitrogen can be applied to only those portions of the field that need it. This system requires extensive technology because of the vast number of plants that are to be evaluated. For example, an average farm size in 2015 is 441 acres. For corn farms, more than 25,000 corn plants are found in each acre of land. This means that for an average corn farm there are over 10 million corn plants. Assessing the soil conditions next to each corn plant by hand is not possible. Finding ways to automatically assess the soil around each corn plant is also challenging because of the difficulty of moving soil sensors through a growing corn field in a fast and efficient way.

Figure 1:
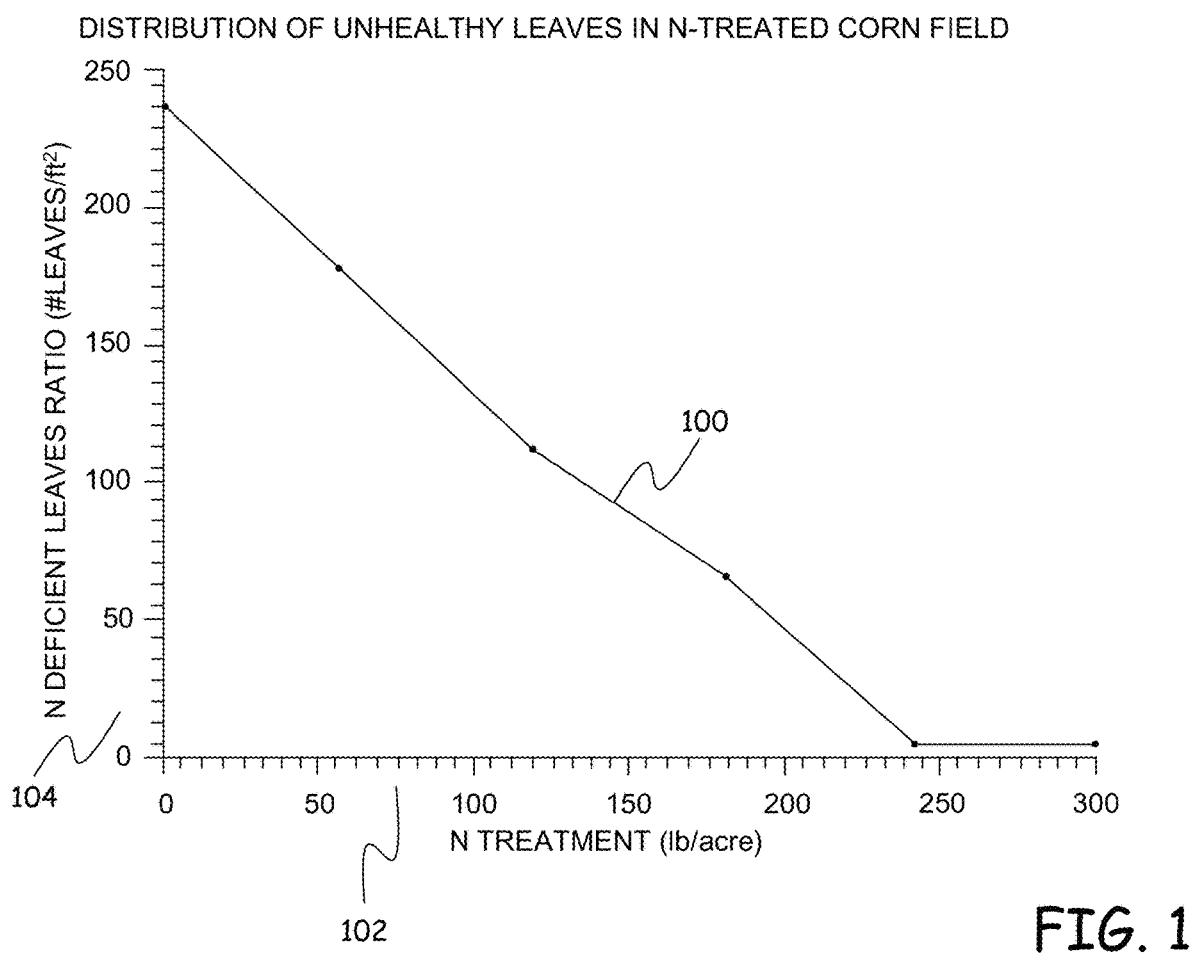
FIG. 1 is a diagram that shows the distribution of the number of Nitrogen-deficient leaves counted versus the amount of Nitrogen fertilizer the land received before the seeding process.

The present inventors have discovered a solution to the problem of not being able to test the soil next to every plant. This solution is based on experiments by the present inventors that have shown a clear correlation of the number of nitrogen deficient (N-deficient) leaves on a plant with the amount of Nitrogen fertilizer that has been applied before the seeding of the plants. FIG. 1 provides a graph 100 of the experimental results showing that the density of N-deficient leaves 104 decreases as the amount of applied Nitrogen per acre 102 increases. Thus, the number of N-deficient leaves is correlated to the amount of nitrogen in the soil. The various embodiments provide methods and systems that are able to identify and count N-deficient leaves based on images of a corn field. The embodiments provide:

A segmentation scheme for robust and accurate clustering of pixels based on color, and A methodology for the extraction of descriptors that capture N-deficiency in corn leaves.

The techniques used in the various embodiments improve the performance of the computing devices used to identify areas of a field that are Nitrogen deficient. In particular, the segmentation scheme greatly reduces the amount of computing resources used to assess N-deficiency by identifying areas of an image that are most likely to be relevant when determining N-deficiency. In addition, the assessment methodology improves accuracy of the computing device when identifying N-deficient portions of a field.

The Architecture

A. Architecture Overview

The various embodiments use a collection of visible images of a farm field. High resolution RGB images are initially collected by a small-scale UAV at a low altitude flight (15 m) that cover a wide area of the field. In accordance with one embodiment, the flight is semi-automated with waypoints provided beforehand and the camera is manually triggered once the UAV reaches a waypoint.

Figures 2A, 2B:
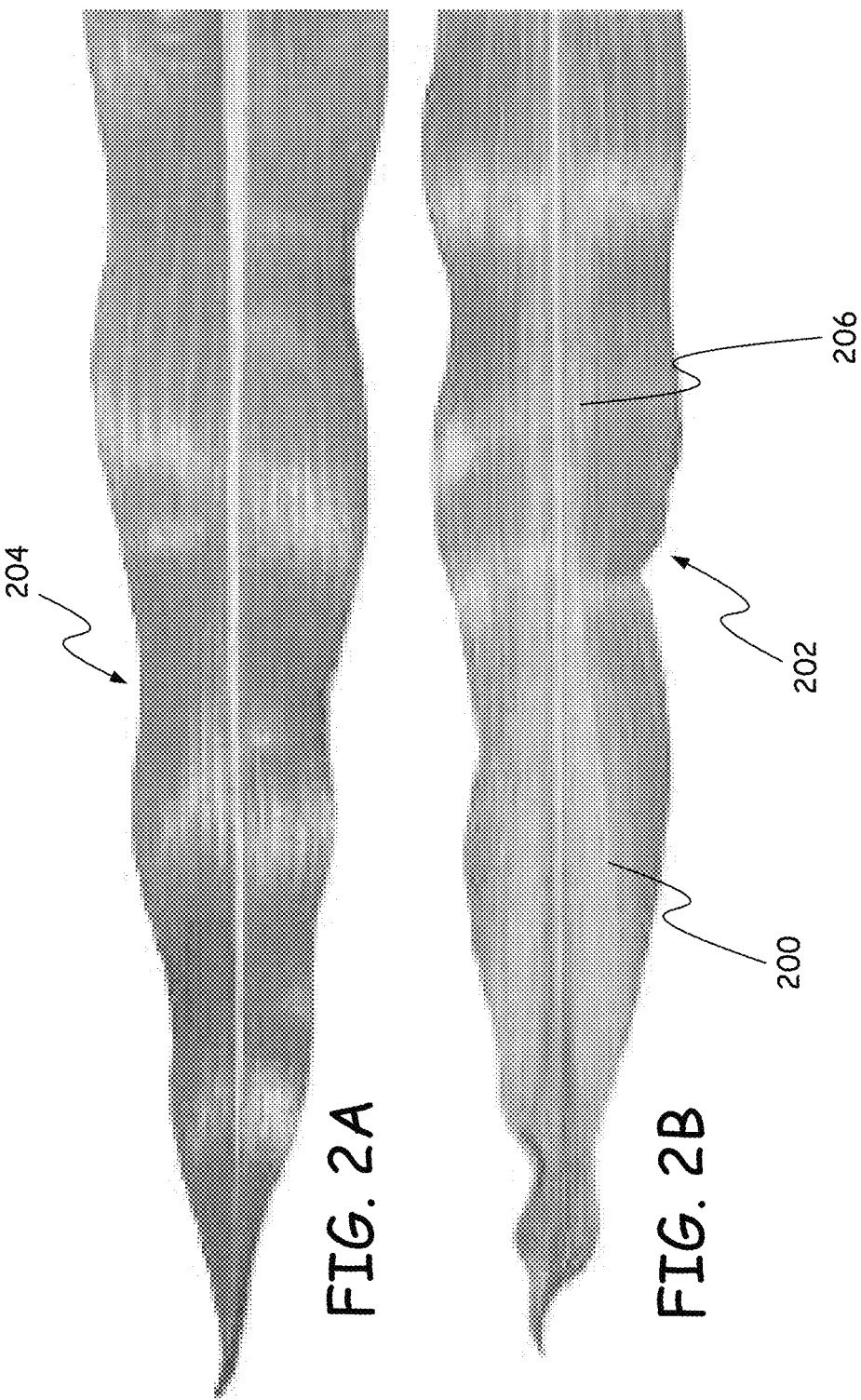
FIG. 2A is a top view of a healthy leaf and FIG. 2B is a top view of a Nitrogen-deficient leaf.

A visual observation reveals certain image characteristics that guide the proposed methodology for detecting N deficiency. FIG. 2A shows a healthy leaf 204 and FIG. 2B shows a N-deficient leaf 202. As seen in FIG. 2B, the methodology of the present embodiments capitalizes on two features: (i) the unhealthy part is denoted by the yellow colored part 200 of the leaf 202, and (ii) the "V" shape 206 outlined by the complement of the yellow component of the leaf with respect to its healthy (green) counterpart.

The two aforementioned characteristics are directly associated with two implementation modules of the various embodiments. The first module locates rectangular regions in images that potentially include N-deficient leaves. The second module acts as a filter of the output of the first module, further refining the regions so as to remove some regions such that the remaining regions are identified as containing N-deficient leaves with a high degree of confidence.

B. Hardware

Figure 3:
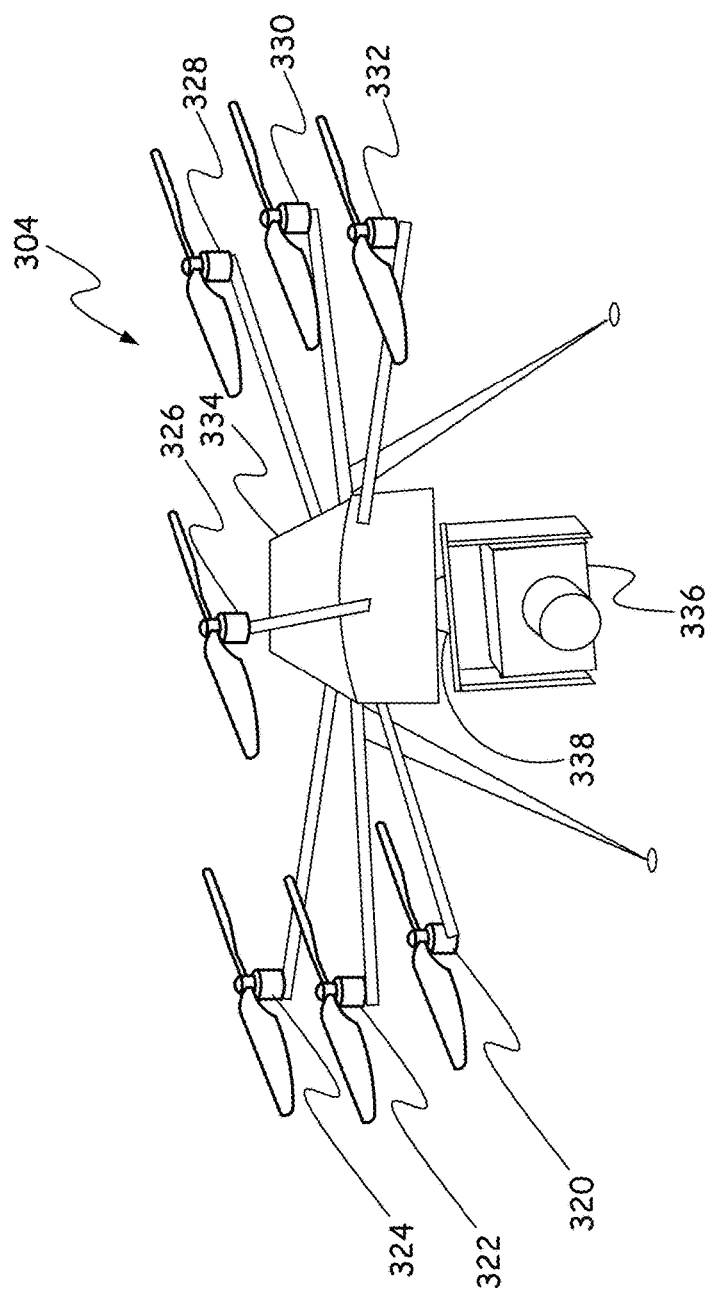
FIG. 3 is a RGB camera mounted on an unmanned aerial vehicle.

The data collection process is aided by the deployment of a small-scale UAV robot with an attached high resolution RGB camera. FIG. 3 provides a perspective view of an unmanned aerial vehicle (aerial drone) 304. Unmanned aerial vehicle 304 includes rotors such as rotors 320, 322, 324, 326, 328, 330 and 332, which are controlled by a printed circuit board in a central housing 334 and allow unmanned aerial vehicle 304 to launch, fly to preset locations, return to a landing area, and land automatically. Unmanned aerial vehicle 304 includes a visible spectrum camera 336 that can be rotated to different positions by control mechanisms 338 under housing 334. In accordance with some embodiments, camera 336 is an RGB camera. Camera 336 can capture images with the lens of camera 336 pointing directly downward while unmanned aerial vehicle 304 is at an altitude above a field.

In accordance with one embodiment, unmanned aerial vehicle has the ability to carry a payload of 2500 g and when loaded with camera 336 has a flight time of 15 minutes. In accordance with one embodiment, UAV 304 includes a Wi-Fi transmitter that streams low quality video to a remote computer that includes a display screen. Using the display screen on the remote computer, a person can view the images being captured by camera 336. A user interface shown on the display can then be used to send control messages to the Wi-Fi transmitter on UAV 306. The control messages are interpreted by a processor on the printed circuit board as instructions that cause UAV 304 to change the position or orientation of UAV 304 and/or the orientation of camera 336 to improve the images being captured by camera 336.

Algorithmic Components

In this section, the two data processing modules are discussed in detail starting with the first module (recommendation scheme) followed by the second module (N-deficiency assessment).

A. Recommendation Scheme

The first step towards identifying N-deficient leaves in images is to recommend image regions that hold significant information regarding the general state of health of the individual leaves. This is an important step in the process pipeline, because it limits the computations to only small image areas, thus increasing performance and reducing computational time.

Figure 4:
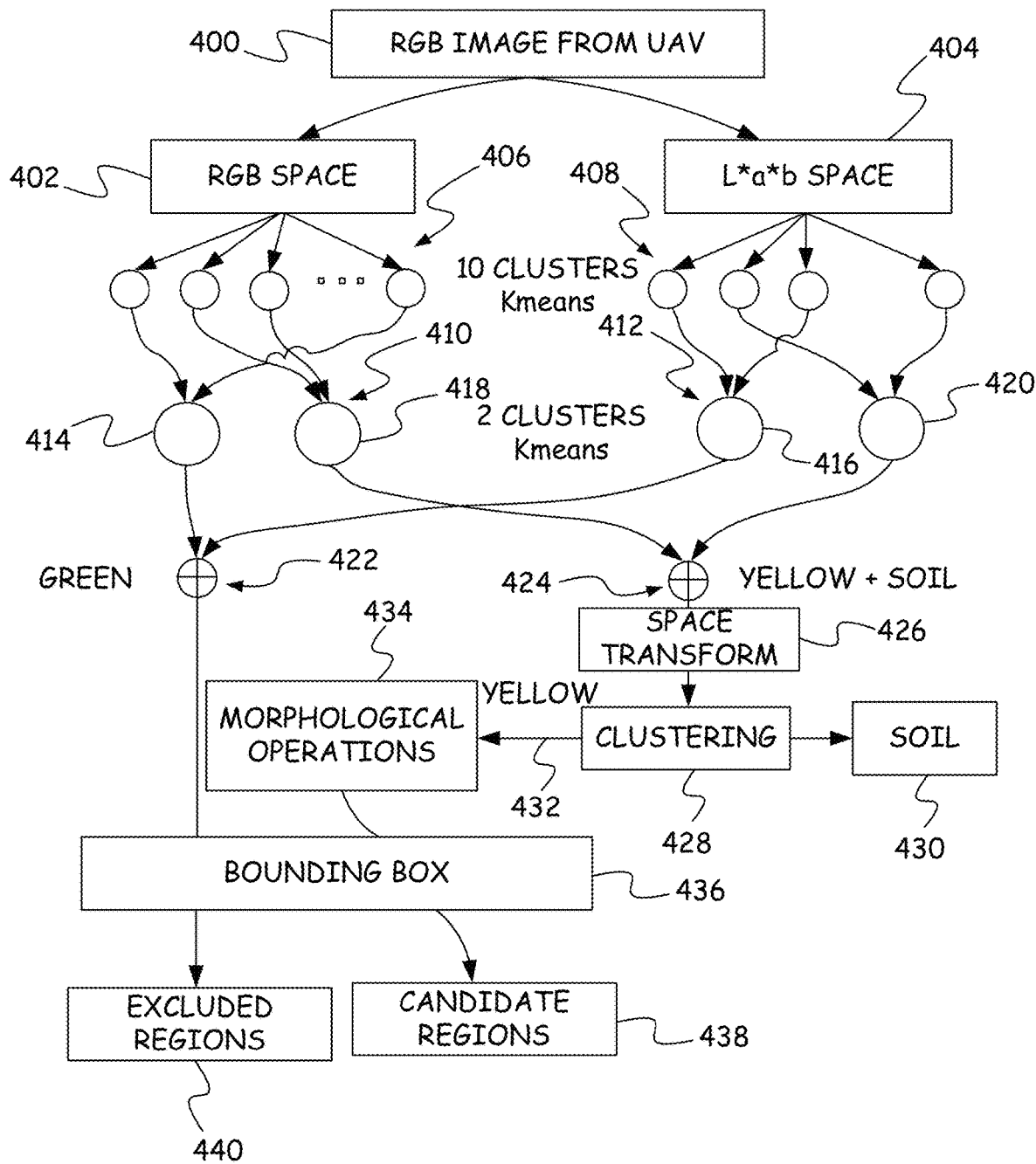
FIG. 4 is a flow chart that visualizes the steps followed by a recommendation scheme in accordance with one embodiment.

The concept behind the recommendation algorithm is to cluster pixels that are of the same color together and then place bounding boxes around neighboring pixels that are in the same cluster. The conceptual flow of this recommendation module can be found in FIG. 4 in which pixels are clustered into 3 colors of pixels with the first cluster consisting of green pixels, the second of yellow pixels (associated with potential N deficiencies), and the last of other-colored pixels corresponding to the soil.

In accordance with one embodiment, multi-stage unsupervised clustering is used to cluster the pixels into green, yellow and soil pixels. Before the clustering begins, each pixel from the RGB camera image 400 is mapped from the RGB color space 402 to another color space such as L*a*b color space 404 so that there are two different representations of the color of each pixel. Two independent clustering operations are then performed, one for the RGB color values and one for the L*a*b color values. For each color space, the clustering operation is a two stage clustering followed by combining of the resulting clusters from each color space.

In the first stage of the two-stage clustering, unsupervised clustering 406, 408 is performed to form 10 clusters for each color space 402, 404, respectively. In accordance with one embodiment, K-means clustering is used with random initialization of the 10 clusters.

In the second stage, the 10 clusters of each color space are clustered at steps 410, 412 into two respective clusters forming clusters 414 and 418 for RGB color space 402 and clusters 416 and 420 for L*a*b color space 404. Clusters 414 and 416 contain pixels from the green clusters and clusters 418 and 420 contain pixels from all of the other clusters. In accordance with one embodiment, K-means clustering is used for the second stage with biased initialization in which the initialization point for the green clusters are selected from a normal distribution with a mean that is deep in a green region of the color space.

The resulting two clusters 414, 418/416, 420 for each color space are then combined into two combined color clusters 422 and 424: with cluster 422 for green pixels and cluster 424 for other colored pixels. In accordance with one embodiment, this combination is made by forming a superset of the pixels that are identified as belonging to the green cluster in each color space. Thus, if a pixel is in both green cluster 414 and green cluster 416 it is placed in combined green cluster 422. In addition, if a pixel is in green cluster 414 for RGB color space 402 but is in other color cluster 420 for L*a*b color space 404, the pixel is added to combined green cluster 422 instead of combined other color cluster 424. Similarly, if a pixel is in green cluster 416 for L*a*b color space 404 but is in other color cluster 418 for RGB color space 402, the pixel is added to combined green cluster 422 instead of combined other color cluster 424. The naive approach of segmenting the green parts using only a single color space is not accurate for all images. This is especially true in images with few N-deficiencies, where a significant variance in the representation of the green color is present. The accuracy of the segmentation increases when combining the clustering results of the two color spaces. This method achieves robust results in the segmentation of green pixels for all the subject images.

In the visible spectrum, the automated distinction between yellow pixels and pixels belonging to the soil proves to be particularly challenging. In order to successfully apply an unsupervised clustering, it is helpful to bring the data in a form that takes advantage of the inherent properties of the clustering algorithm employed.

Figure 5:
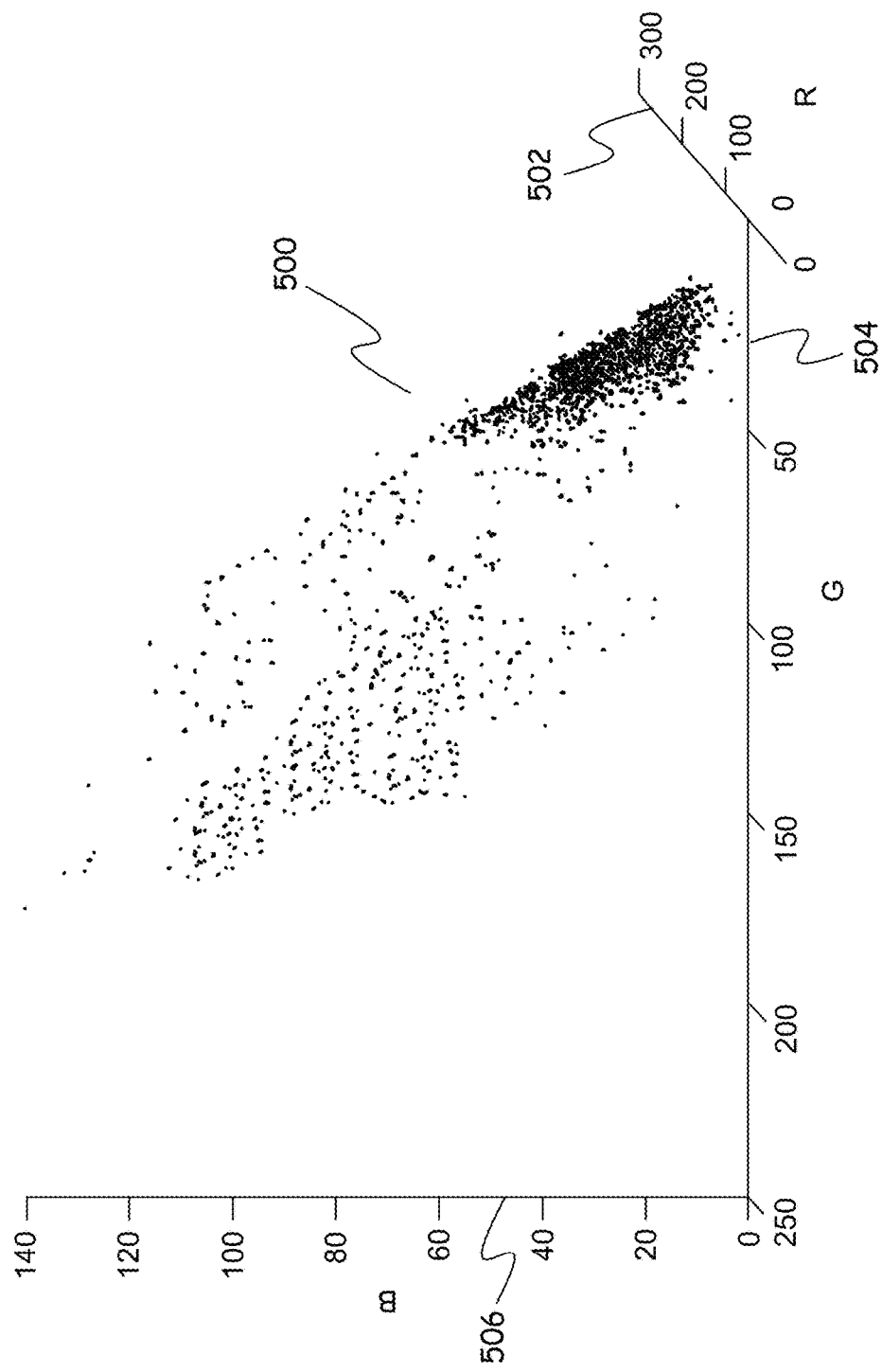
FIG. 5 is a graph showing collected pixel values in a three-dimensional space.
Figure 6:
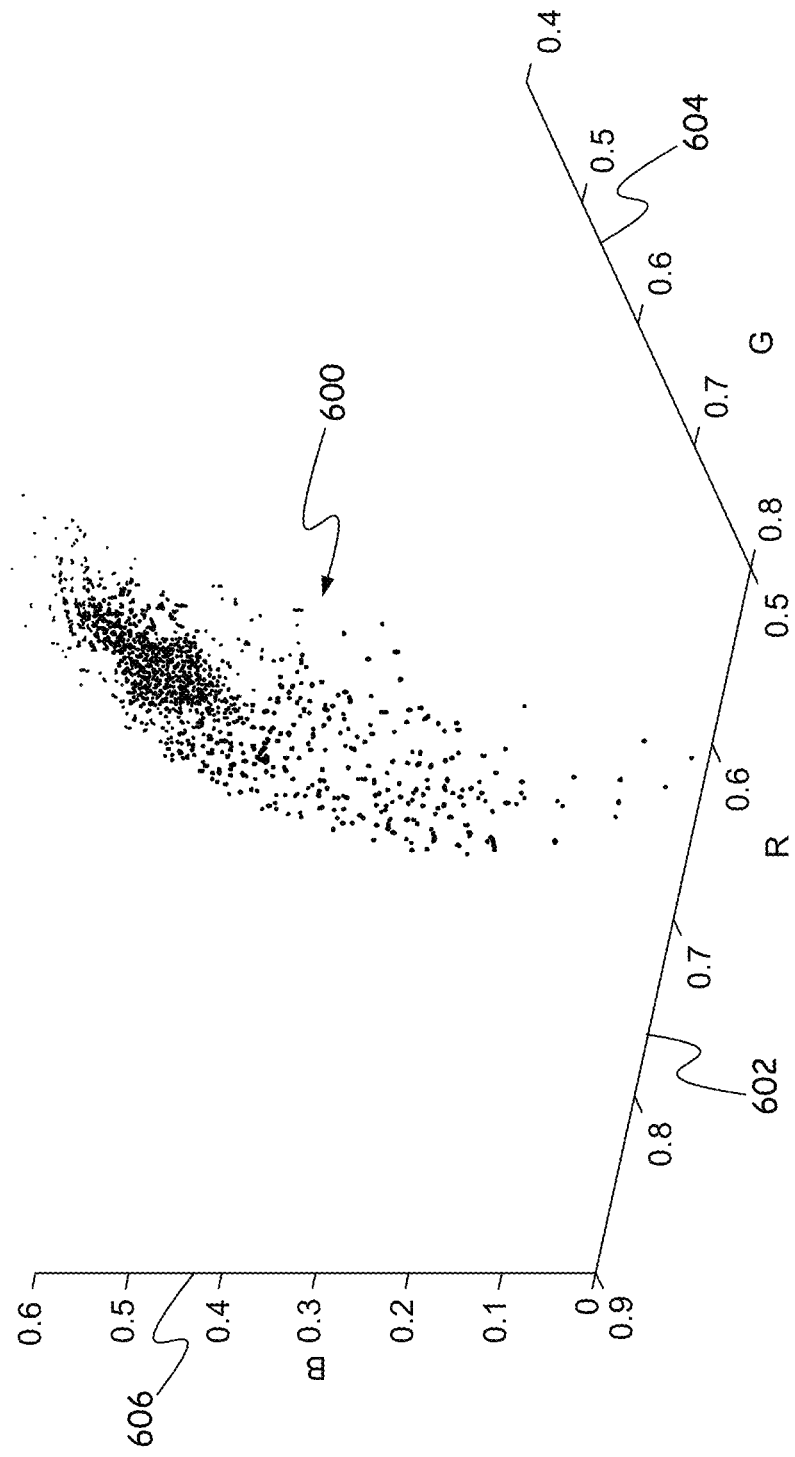
FIG. 6 is a graph showing the collected pixel values mapped onto a unit sphere in the three-dimensional space.

FIG. 5 shows a distribution of pixel values 500 from an RGB image across the three-dimensional RGB color space defined by Red axis 502, Green axis 504 and Blue axis 506. This distribution does not align well with the tendency of K-means clustering to assume ellipsoid distributions for data in each cluster. To improve the separation of yellow pixels from soil pixels, the pixels in cluster 424 are applied to a space transformation 426 to better align the data with the inherent properties of K-means clustering. In one embodiment, this transformation involves projecting the pixel values of the pixels in cluster 424 onto a unit sphere by dividing each pixel vector by the magnitude of the vector. FIG. 6 shows a distribution of transformed pixel values 600 for the pixels in yellow and soil cluster 424 across the three-dimensional RGB color space defined by Red axis 602, Green axis 604 and Blue Axis 606.

After the yellow and soil colored pixels have been transformed, the transformed pixels are applied to additional K-means clustering 428 with initialization points deep in the brown and yellow areas, resulting in a robust performance that is data driven and does not depend on human selected thresholds. This produces soil colored pixels 430 and yellow pixels 432.

Finally, morphological operations 434 are applied to the yellow pixels to identify spatially grouped regions of yellow pixels. Specifically, parts of the plant that are one pixel apart and are in yellow cluster 432 are placed in the same spatial group. In addition, discontinuities, such as pixels of a different color that are surrounded by yellow pixels are added to the yellow spatial group and are considered to be yellow pixels. An additional morphological step removes small groups of yellow pixels based on a threshold that considers their size. The threshold is manually selected through a trial and error process and can fluctuate depending on the resolution of the initial image. The smooth and symmetrical objects that result from these morphological operations guarantee high performance of the feature extraction step described in the next section. The resulting spatially grouped regions of yellow pixels are spatially continuous in that each yellow pixel in the spatially grouped region is positioned next to at least one other yellow pixel in the spatially grouped region.

The surviving groups of yellow pixels are provided to a bounding box identifier 436 which constructs a bounding rectangle around each group of yellow pixels. This bounding rectangle includes all of the yellow pixels in the group as well as green pixels that surround the yellow pixels and are within the bounding rectangle. This produces rectangular candidate regions 438, which are the regions within the bounding rectangles, and excluded regions 440, which are the areas outside of the bounding rectangles. Each candidate region is then provided to the second module to verify that the candidate region contains a Nitrogen deficient leaf instead of a tassel or a completely yellow leaf.

B. N Deficiency Assessment

Figure 7:
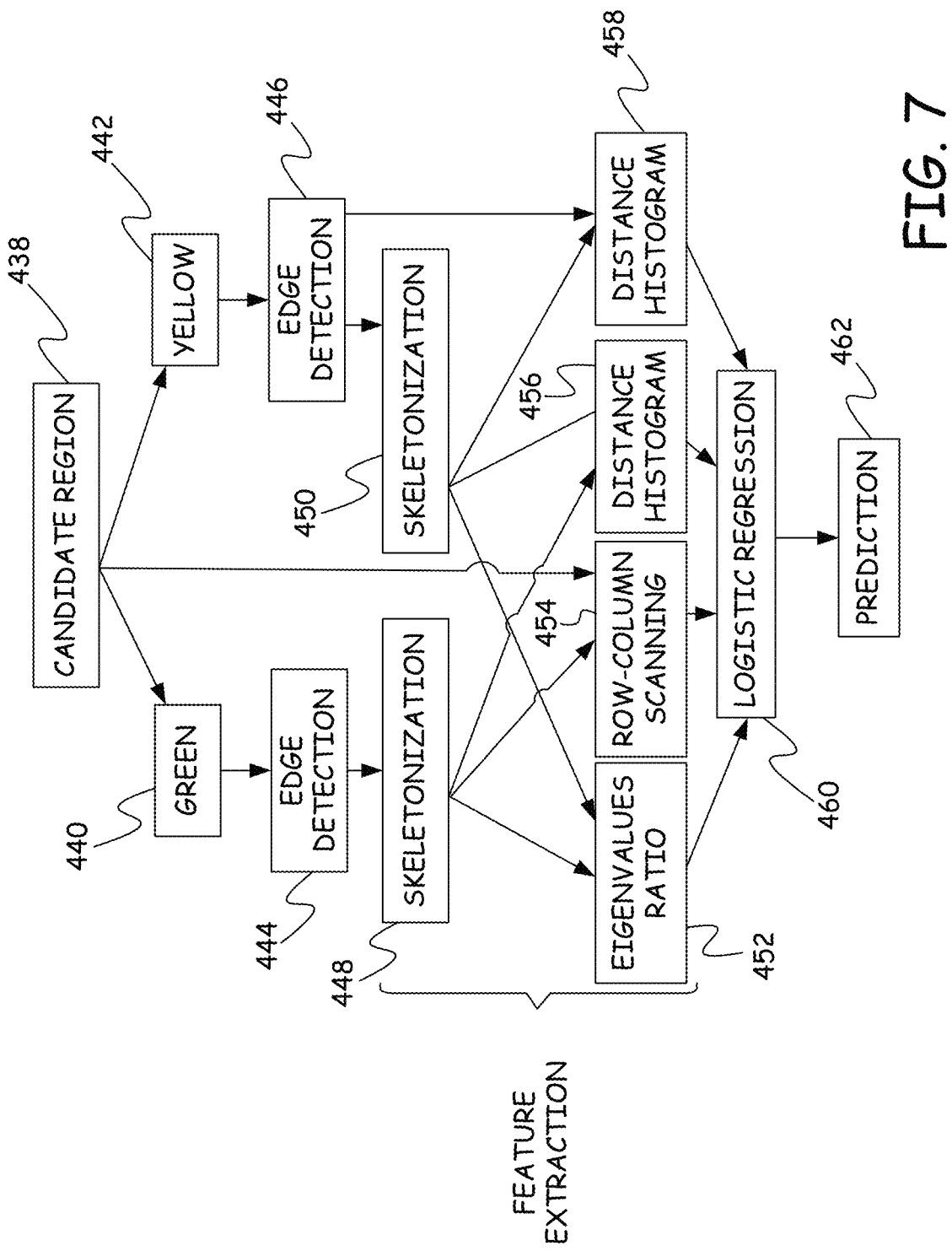
FIG. 7 is a flow chart that presents the steps that lead to the Nitrogen deficiencies assessment of an image.

In this step, an assessment regarding the deficiency of a candidate region is performed as shown in the flow diagram of FIG. 7. The inputs to the method of FIG. 7 consist of rectangular regions 438 suggested by the recommendation algorithm, and depict potentially affected parts of corn plants captured in an image. Among the selected candidates, the leaves that are exhibiting N deficiency need to be separated from the rest (e.g. tassels or stressed leaves for which assessment cannot be made).

This distinction is based on a "V" shaped deformation that is directly associated with the N deficiency. To detect the "V" shaped deformation, shape or spatial feature values are identified and are applied to one or more classifiers. For example, in accordance with one embodiment, edge detection 444 is applied to green groups 440 in candidate region 438 and edge detection 446 is applied to yellow groups 442 in candidate region 438. In accordance with one embodiment, the edge detection algorithm is based on gradients of color and provides the edges between each yellow group 442 and each green group as well as the edges between one green structure (leaf, stem) and a neighboring green structure or soil. Thus, edge detection algorithm 444 provides edges between overlapping leaves. Once the edges have been identified, the edges for each yellow portion are applied to skeletonization algorithm 450 the edges for each green portion next to a yellow portion are applied to skeletonization algorithm 448, and each skeletonization algorithm identifies a skeleton for each portion it receives. In accordance with one embodiment, a skeleton is found by sequentially removing layers of edge pixels and designating pixels next to the removed edge pixels as new edge pixels. During the removal process, an edge pixel is only removed if removing the pixel will not cause a break in the group. If removing the pixel will cause a break in the group, the pixel is maintained as an edge pixel. When no further edge pixels can be removed without causing a break in the group, the final set of pixels represents the skeleton.

The edges detected by edge detection 446 and the skeletons identified by skeletonization algorithms 448 and 450 are applied to feature extractors 452, 454, 456, and 458. In accordance with one embodiment, each feature extractor produces features that are scale and rotation invariant to account for the fact that the orientation of the leaves and their size depend on the position of the camera and the growth of the plant. In particular, the coordinates of the pixels belonging to skeletons and edges are normalized with respect to the size of their respective bounding box in order to introduce scale invariance in the methodology.

In feature extractor 452, covariance matrices of the green and yellow skeletons are extracted and their eigenvalues are computed. In this case, the covariance matrix $C \in R^{2 \times 2}$ describes the distribution of the pixels of the skeleton around its centroid. The two eigenvalues $\sigma_1$, $\sigma_2$ of the covariance matrix are determined and provide the dispersion of the pixels along the direction of the two eigenvectors of C. The ratio of the two eigenvalues $\sigma_2/\sigma_1$ is output for each green and yellow skeleton in candidate region 438 as the extracted features from feature extractor 452. Each of these features encapsulates the shape of a respective skeleton.

Feature extractor 456 determines histograms of minimum distances between the yellow skeleton and the green skeletons. Feature extractor 456 determines histograms of minimum distance between the yellow skeleton and the edges of the yellow region in candidate region 438. This approach ensures the rotation invariance of the features. Particularly, the histogram of minimum distance for pixel i along the skeleton s is computed as follows: is calculated as $$d_i = \inf \|s_i - e_j\|, \forall j=1, \ldots, n_e, i=1, \ldots, n_s \quad (1)$$

where $n_s$ is the number of pixels of the skeleton, $s_i$ are the pixels of the skeleton, $e_j$ are the pixels of the edges and $n_e$ is the number of pixels of the edges. To compute the minimum distance between each pixel of a skeleton and another skeleton, the pixels of the edges in equation 1 are replaced with the pixels of the other skeleton. If the histogram of distances is seen as a distribution of points, then the features that characterize it are the first four moments of this distribution: (i) the mean, (ii) the variance, (iii) the skewness, and (iv) the kurtosis, which are the feature vectors output by feature extractors 456 and 458 for each distance histogram.

Feature extractor 454 scans candidate region 438 vertically and horizontally counting how many times the skeleton of a green part is encountered in each row and column and provides the count for each row and column of pixels as an output feature.

Figure 8:
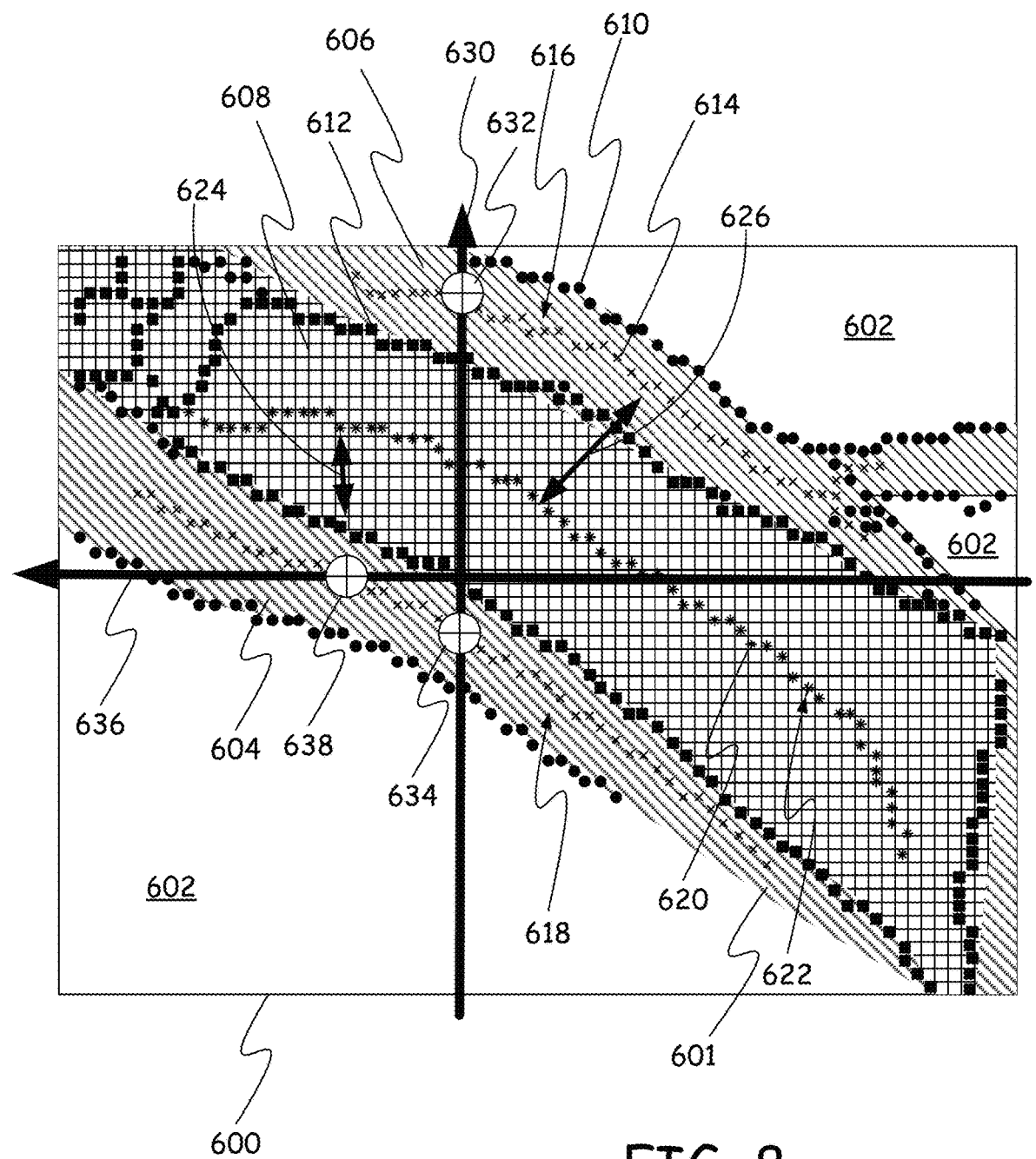
FIG. 8 shows a visualization of the features extracted from the prediction of Nitrogen-deficient leaves.

FIG. 8 provides a visualization of a recommended segment/candidate region 600 showing the various features that are extracted in the process shown in FIG. 7. Recommended segment 600 is an image of a leaf 601 with ground 602 in the background. Leaf 601 includes two green portions 604 and 606 that are separated by a yellow portion 608. The solid round circles, such as solid round circle 610, show the edge of the green portions and the solid squares, such as solid square 612 show the edges of yellow portion 608. The x's, such as x 614, show the skeletons 616 and 618 of the green portions and the asterisks, such as asterisk 620, show the skeleton 622 of yellow portion 608. Arrow 624 shows a minimum distance between a point on skeleton 622 and the edge of yellow portion 608 and arrow 626 shows the minimum distance between a point on skeleton 622 and skeleton 616. Vertical arrow 630 represents a vertical scan of segment 600 and shows two intersection points 632 and 634, where each intersection point is an intersection with one of the green portion skeletons 616 and 618. Horizontal arrow 636 represents a horizontal scan of segment 600 and shows one intersection point 638 with green portion skeleton 618.

As presented in FIG. 8, for a N-deficient leaf, the distribution of the skeletons tends to be elongated towards one direction, the distances between the skeleton and edges of the yellow part are distributed symmetrically around the yellow part's skeleton in an almost consistent distance, and the skeleton of the green part that is enclosing the yellow part is encountered two times during the rows' and columns' scanning. On the other hand, non-N-deficient suggestions generally have a cyclic distribution of skeletons, the distances between skeletons and edges are irregular, and in the case of tassels the scanning process would encounter the same skeleton multiple times.

The features extracted by feature extractors 452, 454, 456 and 458 are provided to a Logistic Regression classifier 460 that has been trained on features extracted from labeled image regions where some of the regions include N-deficient leaves and some regions do not. Logistic Regression is selected over Naive Bayes and SVM with linear kernels, because it achieves a better overall accuracy. As shown later, the imbalance in the number of queries between the two classes of the classification introduces problems regarding the sensitivity of the model for the Logistic Regression classifier. Sacrificing the accuracy for a better balance between sensitivity and specificity can be achieved through an SVM classifier with RBF kernels. Logistic regression classifier 460 then outputs a final indication 462 of whether the region includes a N-deficient leaf.

The number of regions that are classified as containing an N-deficient leaf by Logistic regression classifier 460 are then stored in memory together with an identifier for the part of the field captured in the image. This count can then be combined with counts from other images to identify parts of the field that are N-deficient and therefore require the application of additional Nitrogen. For example, a threshold number of leaves can be set such that when the count exceeds the threshold, the part of the field captured in the image is designated as being N-deficient. Thus, the count can be used to store a current Nitrogen level for various parts of an agricultural field.

Figure 9:
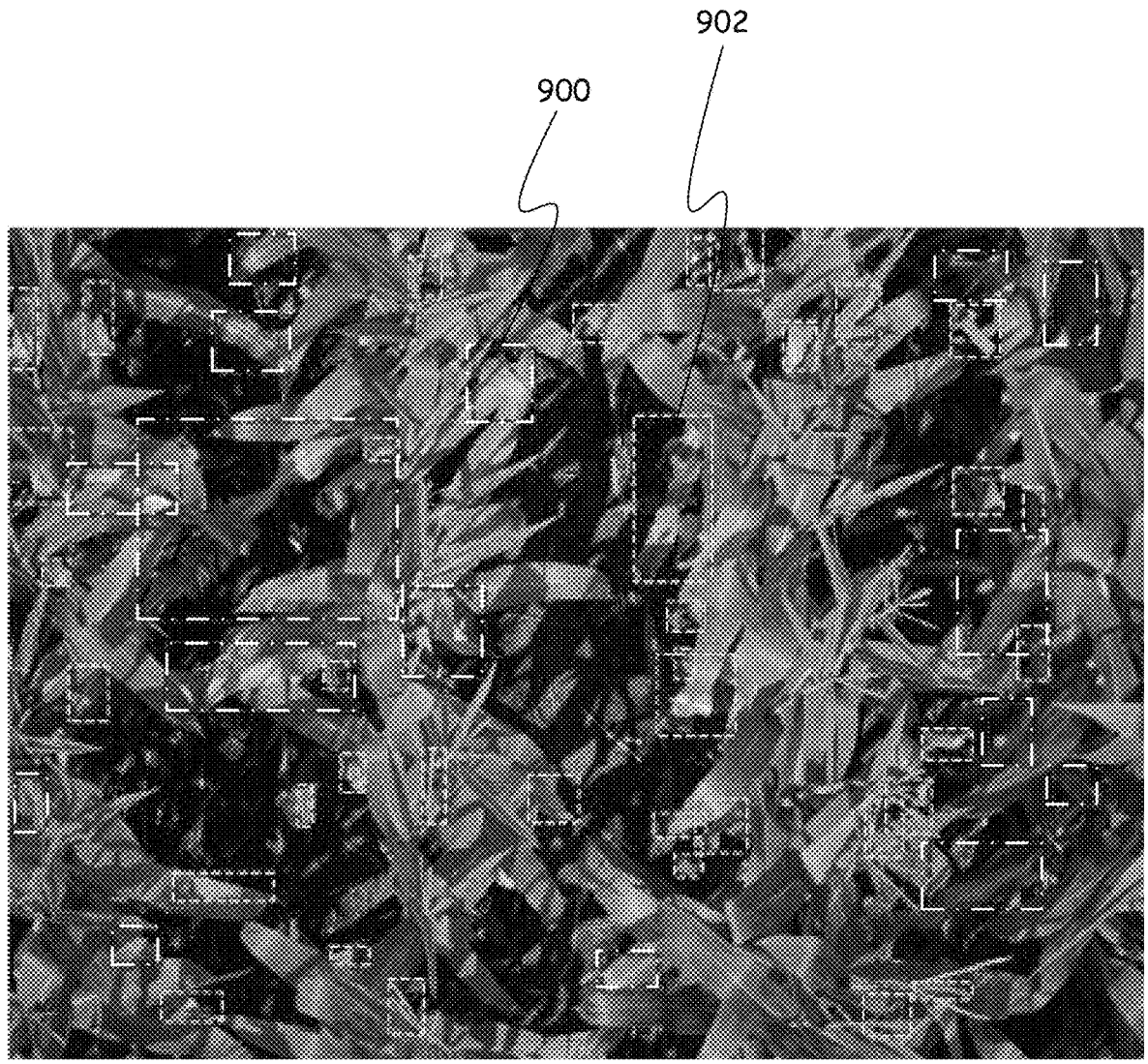
FIG. 9 shows the output of the classification scheme overlaid on an image of a heavily Nitrogen-deficient portion of a field.

The results in FIG. 9 show a collection of candidate regions 438 in an image where the candidate regions shown by dash-dot-dash boxes, such as region 900, were classified as N-deficient by Logistic Regression classifier 460 and candidate regions shown in dashed boxes, such as region 902, were classified as not being N-deficient by Logistic Regression classifier 460.

Experimental Results

Prior to the presentation of the results, it is important to address a major obstacle when dealing with the visible spectrum imaging, which is the illumination inconsistency. The application of the proposed scheme to a real world setting requires the assembly of information regarding the weather conditions during the flight. The findings based on the National Climatic Data Center of the National Oceanic and Atmospheric Administration (NOAA) show that 30% of the days of the year that corn is being grown the sunshine provides ideal illumination for imaging, while about 60% of the same period of time the existing weather conditions advocate for an acceptable analysis of RGB images. These findings suggest that the proposed architecture is capable of providing information throughout the biggest portion of the corn growing cycle.

The dataset that was processed consists of 39 high-resolution RGB images gathered by UAV 304 (FIG. 3) over two days and a time period between 10 am and 1 pm. Twenty-one images show a severe deficiency state where no N fertilizer was applied and eighteen images depict a state where 280 lbs/acre of N were applied before the seeding process. All plants were planted the same day and the soil differences in nutrients and color are statistically insignificant. The images collected by the UAV were transferred to a remote station that handled the offline computations upon the completion of the flight.

A. Recommendation Scheme

The first step of the proposed architecture includes the validation of the accuracy of the segmentation algorithms as well as the performance of the recommendation scheme.

TABLE I

Green Pixels Segmentation Accuracy in Different Color Spaces

| Deficiency Level | RGB | L*a*b | Combined Spaces |
|---|---|---|---|
| Heavy | 96.0% | 97.0% | 96.4% |
| Light | 70.2% | 51.7% | 92.3% |

TABLE II

Accuracy, Sensitivity, and Specificity for Logistic Regression
(LR) and SVM with RBF Kernels (SVM) of Different σ Parameters

|  | LR | SVM (σ = 1) | SVM (σ = 2) | SVM (σ = 4) | SVM (σ = 6) | SVM (σ = 8) |
|---|---|---|---|---|---|---|
| Acc. | 79.2% | 74.4% | 73.7% | 72.3% | 70.8% | 68.9% |
| Sens. | 29.5% | 19.3% | 55.0% | 62.1% | 61.8% | 62.7% |
| Spec. | 95.0% | 94.2% | 80.4% | 76.0% | 74.0% | 71.1% |

The results for the green pixels' segmentation are summarized in Table I. These results were computed with the help of 4 hand-drawn masks (2 for each case of severe and light deficiency) created on 4 different images.

It is evident from the last column of Table I that the mixed spaces hierarchical K-means scheme performs better than a naive single color space K-means approach, since it remains consistently accurate for the different levels of N deficiency (heavy and light).

Applying the recommendation algorithm on all the captured images resulted in the creation of 1279 queries including N-deficient leaves, tassels, and non-N-deficient yellow regions. Three hundred and eleven (311) of the queries were groundtruthed as N-deficient, while the remaining nine hundred and sixty eight (968) were assessed as being non-N-deficient. The percentage of N-deficient leaves that were missed during the suggestion phase was manually estimated at 5.3% for the severely deficient case and 23.1% for the images with the healthier plants. The undetected areas in the second case are due to the heavy occlusion and the absence of illumination in the lower leaves of the plants making their discernment challenging even for a human. This outcome does not undermine the value of the proposed methodology, since it applies to plants whose yield is not significantly affected by the lack of N.

B. N Deficiency Assessment

The classification models were trained on a subset of 1279 queries and applied to a test set to measure the performance of the method following a 10-fold validation scheme. The classification of N-deficient leaves versus the rest non-N-deficient suggestions for a Logistic Regression classifier achieved 84.2% correct classification for the heavily deficient cases and 72.9% for the light deficient case. In the second case, several suggestions that represent tassels were falsely assigned as N-deficient resulting in a drop of performance when compared to the first case. Combining both cases, an overall 79.2% accuracy was reached, with the specificity and sensitivity of the Logistic Regression model being 95% and 29.5% respectively. The high specificity percentage shows that the algorithm is particularly capable of detecting suggestions that are truly non-N-deficient, while the sensitivity result suggests that it lacks the ability to robustly identify the true N-deficient leaves.

The three-to-one ratio between the number of queries of the two classes (968 to 311) is an important factor that relates directly to the performance of the Logistic Regression. Essentially, this ratio favors the selection of more samples from the non-N-deficient queries during the training process, biasing the final parameter estimation of the classifier.

As suggested earlier, it is possible to achieve a better balance between specificity and sensitivity by utilizing a SVM classifier with RBF kernels. Table II presents the accuracy, sensitivity, and specificity for the Logistic Regression versus SVM classifiers with several sigma parameters. These results show that it is possible to attain a better sensitivity outcome with the sacrifice of accuracy. Depending on the desired outcome of the application, different classification models may be used. For example, it is possible to use the Logistic Regression approach to robustly identify the leaves that are not N-deficient and redirect the attention of the farmer to a smaller number of leaves that are more probable to exhibit N deficiency. On the other hand, exploiting the SVM with RBF kernel models can achieve a balanced classification outcome able to successfully suggest true N-deficient leaves.

The results of the proposed methodology support the choice of using ordinary images in the visible spectrum, taken by a sensor that has significantly lower cost than its rivals that operate in the invisible spectrum. A performance of 84.2% is achieved for the correct classification between N-deficient leaves and non-N-deficient yellow image segments. This result sets a strong basis for more elaborated attempts towards the utilization of RGB imaging for close up precision agriculture in fields.

Figure 10:
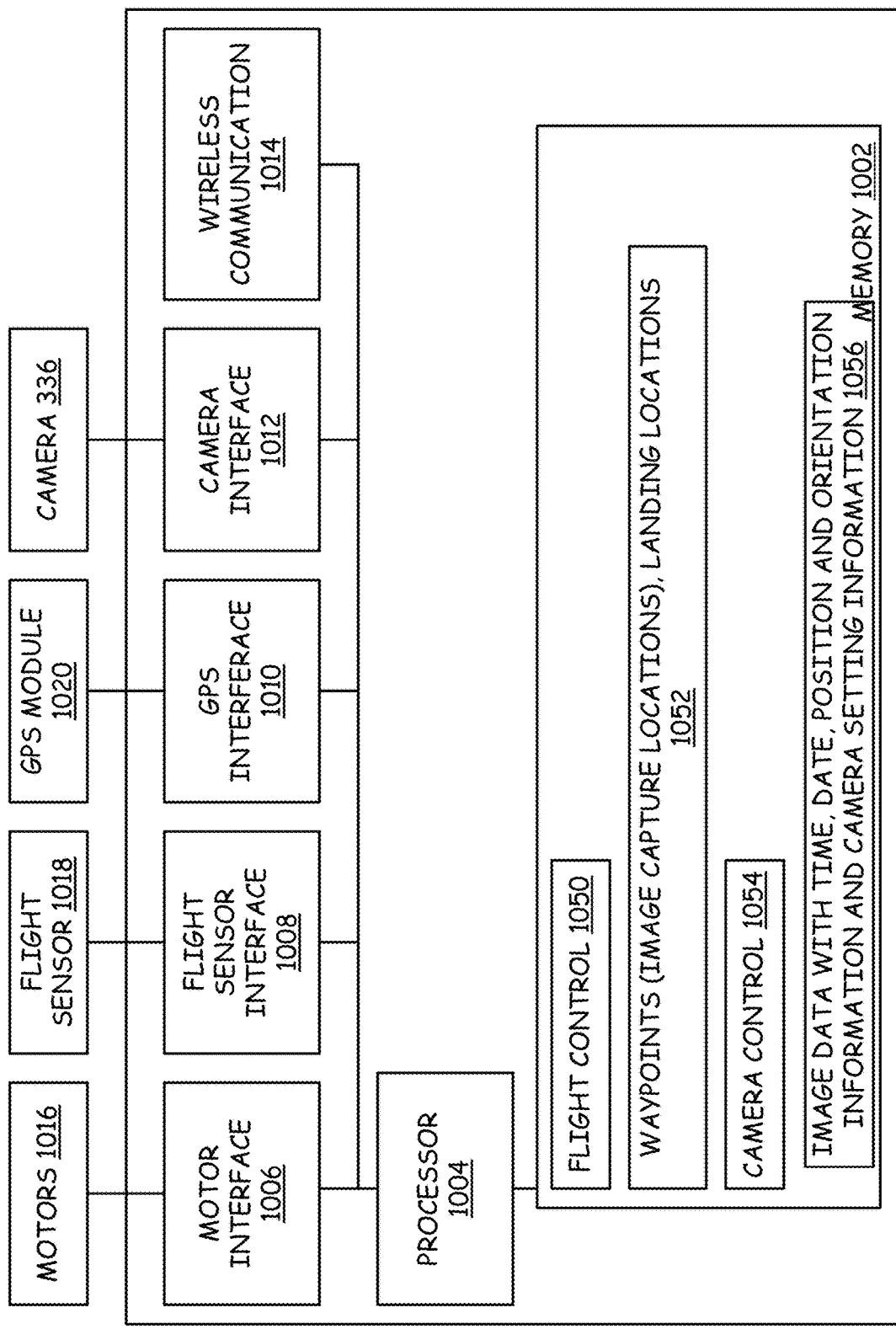
FIG. 10 is a block diagram of elements in an exemplary unmanned aerial vehicle.

FIG. 10 provides a block diagram of elements found in unmanned aerial vehicle 304 including a printed circuit board 1000, motors 1016, flight sensors 1018, and Global Positioning Satellite (GPS) module 1020. Although FIG. 10 shows a single printed circuit board 1000, the components on printed circuit board 1000 may be distributed across multiple printed circuit boards in unmanned aerial vehicle 304. Printed circuit board 1000 includes a memory 1002, a processor 1004, a motor interface 1006, a flight sensor interface 1008, GPS interface 1010, camera interface 1012 and a wireless communication module 1014. Motor interface 1006 acts as an interface between processor 1004 and one or more motors 1016 used to turn the rotors of unmanned aerial vehicle 304. Flight sensor interface 1008 provides an interface between processor 1004 and one or more flight sensors 1018 that are able to detect the orientation, velocity and acceleration of unmanned aerial vehicle 304 along three separate axes. Flight sensors 1018 can further determine pitch, roll and yaw of unmanned aerial vehicle 304. GPS interface 1010 provides an interface between GPS module 1020 and processor 1004. GPS module 1020 can detect signals from multiple satellites to determine a position of unmanned aerial vehicle 304. This position information can include a latitude and longitude of unmanned aerial vehicle 304 as well as the altitude of unmanned aerial vehicle 304. Camera interface 1012 provides an interface between processor 1004 and camera 336. Camera interface 1012 allows processor 1004 to set parameters for capturing images in camera 336 and to initiate the capturing of images. Camera interface 1012 also relays captured image data from camera 336 to processor 1004 for storage in memory 1002.

Wireless communication subsystem 1014 can include one or more communication modules for communicating with other devices using one or more communication protocols. For example, wireless communications 1014 can support wireless LAN, short-range radio communications, cellular data services and satellite communications. Wireless communication subsystem 1014 allows unmanned aerial vehicle 304 to communicate with a remote base station (not shown).

Memory 1002 includes data and computer-executable instructions to allow processor 1004 to launch unmanned aerial vehicle 304, to attain a desired altitude at a desired image capture location, to fly between image capture locations (also referred to as collection locations or waypoints), to return to a landing area and to land. In particular, memory 1002 includes flight control instructions 1050 that are used by processor 1004 to control motors 1016 based on sensor data from flight sensors 1018 so that unmanned aerial vehicle 304 maintains stable flight and is able to launch, land and fly between way points along a path. Memory 1002 also includes waypoints and landing locations 1052 which are used by processor 1004 to know where unmanned aerial vehicle 304 should fly to when it is launched, where camera 336 should be instructed to capture images along the flight path, and where unmanned aerial vehicle 304 should land. Memory 1002 also includes camera controls 1054 which are settings for camera 336 that are to be used when capturing images.

Image data captured by camera 336 are stored by processor 1004 along with time and date information, camera settings information and camera position and orientation information as image data 1056. Thus, for each image captured by camera 336, processor 1004 augments the image data with metadata that describes the time and date the image was captured, the position and orientation of camera 336 when the image was captured and the camera settings such as filters used by the camera when the image was captured.

Figure 11:
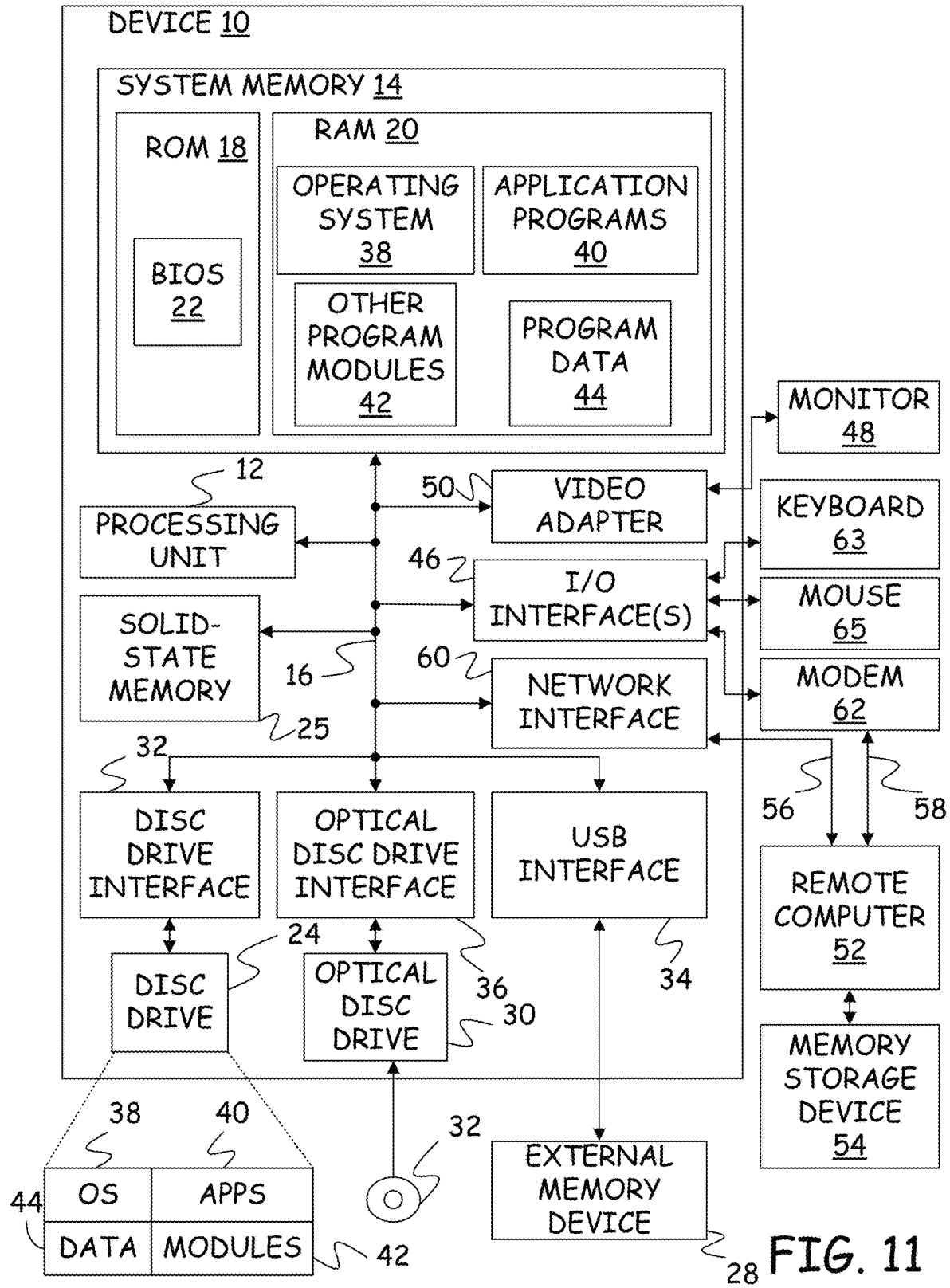
FIG. 11 is a block diagram of a computing device the recommends segments and analyzes recommended segments to determine if the recommended segments contain Nitrogen-deficient leaves.

An example of a computing device that can be used to identify recommended segments and analyze the segments to identify N-deficient leaves in the various embodiments is shown in the block diagram of FIG. 11. The computing device 10 of FIG. 11 includes a processing unit 12, a system memory 14 and a system bus 16 that couples the system memory 14 to the processing unit 12. System memory 14 includes read only memory (ROM) 18 and random access memory (RAM) 20. A basic input/output system 22 (BIOS), containing the basic routines that help to transfer information between elements within the computing device 10, is stored in ROM 18. Computer-executable instructions that are to be executed by processing unit 12 may be stored in random access memory 20 before being executed.

Embodiments of the present invention can be applied in the context of computer systems other than computing device 10. Other appropriate computer systems include handheld devices, multi-processor systems, various consumer electronic devices, mainframe computers, and the like. Those skilled in the art will also appreciate that embodiments can also be applied within computer systems wherein tasks are performed by remote processing devices that are linked through a communications network (e.g., communication utilizing Internet or web-based software systems). For example, program modules may be located in either local or remote memory storage devices or simultaneously in both local and remote memory storage devices. Similarly, any storage of data associated with embodiments of the present invention may be accomplished utilizing either local or remote storage devices, or simultaneously utilizing both local and remote storage devices.

Computing device 10 further includes a hard disc drive 24, an external memory device 28, and an optical disc drive 30. External memory device 28 can include an external disc drive or solid state memory that may be attached to computing device 10 through an interface such as Universal Serial Bus interface 34, which is connected to system bus 16. Optical disc drive 30 can illustratively be utilized for reading data from (or writing data to) optical media, such as a CD-ROM disc 32. Hard disc drive 24 and optical disc drive 30 are connected to the system bus 16 by a hard disc drive interface 32 and an optical disc drive interface 36, respectively. The drives and external memory devices and their associated computer-readable storage media provide nonvolatile storage media for the computing device 10 on which computer-executable instructions and computer-readable data structures may be stored. Other types of media that are readable by a computer may also be used in the exemplary operation environment.

A number of program modules may be stored in the drives and RAM 20, including an operating system 38, one or more application programs 40, other program modules 42 and program data 44. In particular, application programs 40 can include programs for executing the methods described above including clustering, SVM classification, morphological operators, bounding box identification, skeletonization, edge detection, identification of covariance matrices and eigenvalues of those matrices, row-column scanning, distance histogram formation and logistic regression. Program data 44 may include image data, feature data, class labels, cluster probability functions, classifier accuracy, classifier weights, labeled data, classifier scores and class labels.

Input devices including a keyboard 63 and a mouse 65 are connected to system bus 16 through an Input/Output interface 46 that is coupled to system bus 16. Monitor 48 is connected to the system bus 16 through a video adapter 50 and provides graphical images to users. Other peripheral output devices (e.g., speakers or printers) could also be included but have not been illustrated. In accordance with some embodiments, monitor 48 comprises a touch screen that both displays input and provides locations on the screen where the user is contacting the screen.

The computing device 10 may operate in a network environment utilizing connections to one or more remote computers, such as a remote computer 52. The remote computer 52 may be a server, a router, a peer device, or other common network node. Remote computer 52 may include many or all of the features and elements described in relation to computing device 10, although only a memory storage device 54 has been illustrated in FIG. 11. The network connections depicted in FIG. 11 include a local area network (LAN) 56 and a wide area network (WAN) 58. Such network environments are commonplace in the art.

The computing device 10 is connected to the LAN 56 through a network interface 60. The computing device 10 is also connected to WAN 58 and includes a modem 62 for establishing communications over the WAN 58. The modem 62, which may be internal or external, is connected to the system bus 16 via the I/O interface 46.

In a networked environment, program modules depicted relative to the computing device 10, or portions thereof, may be stored in the remote memory storage device 54. For example, application programs may be stored utilizing memory storage device 54. In addition, data associated with an application program, such as data stored in the databases or lists described above, may illustratively be stored within memory storage device 54. It will be appreciated that the network connections shown in FIG. 11 are exemplary and other means for establishing a communications link between the computers, such as a wireless interface communications link, may be used.

Although the present invention has been described with reference to preferred embodiments, workers skilled in the art will recognize that changes may be made in form and detail without departing from the spirit and scope of the invention.

What is claimed is:

1. A method comprising:
 receiving pixel color values representing an image of a portion of a field, each pixel color value having a respective position within the image;
 a processor identifying groups of the received pixel color values;

for each group of pixel color values:
  the processor converting the pixel color values into feature values that describe a shape of the positions of the group of pixel color values; and
  the processor using the feature values describing the shape to determine whether the group of pixel color values represents a nitrogen deficient leaf of a plant; and
the processor storing in memory an indication that the portion of the field is deficient in nitrogen based on the groups of pixel color values determined to represent a respective nitrogen deficient leaf.

2. The method of claim 1 wherein identifying groups of the received pixel color values comprises:
classifying pixel color values into one of two classes, the two classes comprising a first class containing pixel color values determined to be representative of a particular color and a second class containing pixel color values determined to not be representative of the particular color;
identifying regions of pixel color values of the first class, where each region comprises a plurality of pixel color values in the first class such that each pixel color value of the first class has a position next to a position of at least one other pixel color value of the first class in the image;
defining positions of a respective bounding box for each region, such that the respective bounding box surrounds the positions of the pixel color values of the region and identifying the pixel color values with positions surrounded by the bounding box.

3. The method of claim 2 wherein defining positions of a respective bounding box comprises defining the positions of the respective bounding box such that pixel color values of the second class that have positions outside the region are within the bounding box.

4. The method of claim 3 wherein converting the pixel color values into feature values comprises identifying a skeleton for the region.

5. The method of claim 4 wherein converting the pixel color values into feature values further comprises identifying eigenvalues of a covariance matrix for the skeleton of the region.

6. The method of claim 4 wherein converting the pixel color values into feature values comprises identifying edges of the region.

7. The method of claim 6 wherein converting the pixel color values into feature values further comprises determining distance values between the skeleton for the region and the edges of the region.

8. The method of claim 7 wherein converting the pixel color values into feature values further comprises identifying two areas of pixel color values outside of the region and within the bounding box and identifying a skeleton for each area.

9. The method of claim 8 wherein converting the pixel color values into feature values further comprises determining distances between the skeleton of the region and the skeletons of the areas.

10. The method of claim 8 wherein converting the pixel color values into feature values further comprises performing a plurality of row scans and for each row scan counting the number of area skeletons that are in the row.

11. A system comprising:
an interface receiving image data collected by an unmanned aerial vehicle, the image data representing an image of a portion of an agricultural field in the visible spectrum;
a processor processing the image data to:
  identify a plurality of areas in the image;
  for each identified area, identifying features from the image data wherein the features describe a shape of a shaped region within the area to verify that the area shows a nitrogen deficient leaf; and
  using the verified areas to store an indication of a nitrogen level in the portion of the agricultural field.

12. The system of claim 11, wherein identifying the plurality of areas comprises:
grouping pixels based on a respective color value of each pixel;
for at least one group of pixels, identifying regions were the pixels in the group are spatially continuous; and
for each region, identifying an area that includes the region as one of the plurality of areas.

13. The system of claim 11 wherein identifying features that describe a shape of a shaped region within an area comprises identifying a skeleton of the shaped region.

14. The system of claim 13 wherein identifying features that describe a shape of a shaped region further comprises determining a covariance matrix of the skeleton.

15. The system of claim 13 wherein identifying an area that includes the region comprises identifying an area that includes two additional regions of spatially continuous pixels and wherein the processor further determines a skeleton of each of the two additional regions.

16. A computer-implemented method comprising:
limiting a nitrogen deficiency assessment of leaves in an image to select leaves in the image by grouping pixels in the image into groups based on the visible color of each pixel and identifying the select leaves as leaves that include pixels of a particular group; and
performing the nitrogen deficiency assessment of the select leaves, the nitrogen deficiency assessment of a leaf comprising:
  identifying a skeleton for a spatial shape formed by the pixels in the particular group for the leaf;
  using the skeleton to generate shape feature values for the spatial shape; and
  using the shape feature values to classify the leaf into one of a plurality of nitrogen deficiency classes.

17. The computer-implemented method of claim 16 wherein grouping pixels in the image into groups based on the visible color of each pixel comprises grouping the pixels into groups using two different color spaces.

18. The computer-implemented method of claim 16 wherein using the skeleton to generate shape feature values comprises identifying eigenvalues of a covariance matrix of the skeleton and using the ratio of the eigenvalues as a shape feature value.

19. The computer-implemented method of claim 16 wherein using the skeleton to generate shape feature values comprises identifying edges of the spatial shape and using distances from the skeleton to the edges to generate the shape feature values.

20. The computer-implemented method of claim 16 wherein the nitrogen deficiency assessment of a leaf further comprises identifying skeletons of two spatial shapes formed by pixels in a second group for the leaf and using the skeletons of the two spatial shapes to generate additional shape feature values used to classify the leaf into one of the plurality of nitrogen deficiency classes.

* * * * *